United States Patent
Yang et al.

(10) Patent No.: US 11,155,034 B2
(45) Date of Patent: *Oct. 26, 2021

(54) SYSTEM AND METHOD FOR DISTORTION MITIGATION AND COMPENSATION IN ADDITIVE MANUFACTURING PROCESSES THROUGH B-SPLINE HYPERPATCH FIELD

(71) Applicant: General Electric Company, Schenectady, NY (US)

(72) Inventors: Pinghai Yang, Niskayuna, NY (US); James William Sears, Niskayuna, NY (US); Steven Charles Woods, Greenville, SC (US); Michael Evans Graham, Bethlehem, NY (US)

(73) Assignee: General Electric Company, Schenectady, NY (US)

( * ) Notice: Subject to any disclaimer, the term of this patent is extended or adjusted under 35 U.S.C. 154(b) by 685 days.

This patent is subject to a terminal disclaimer.

(21) Appl. No.: 15/193,612

(22) Filed: Jun. 27, 2016

(65) Prior Publication Data

US 2017/0368753 A1 Dec. 28, 2017

(51) Int. Cl.
   *B29C 64/386* (2017.01)
   *G05B 19/4099* (2006.01)
   (Continued)

(52) U.S. Cl.
   CPC .......... *B29C 64/386* (2017.08); *B33Y 50/00* (2014.12); *G01B 21/20* (2013.01);
   (Continued)

(58) Field of Classification Search
   None
   See application file for complete search history.

(56) References Cited

U.S. PATENT DOCUMENTS 6,399,010 B1  6/2002 Guertin et al.
6,449,113 B1  9/2002 Leclerc et al.
(Continued)

OTHER PUBLICATIONS

Yang, Pinghai et al., "Adaptive Slicing of Moving Least Squares Surfaces: Toward Direct Manufacturing of Point Set Surfaces", Journal of Computing and Information Science in Engineering, vol. 8, Aug. 19, 2008, 11 pp.
(Continued)

*Primary Examiner* — Mohammad Ali
*Assistant Examiner* — Saad M Kabir
(74) *Attorney, Agent, or Firm* — Dority & Manning, P.A.

(57) ABSTRACT

According to some embodiments, system and methods are provided comprising generating a nominal computer-aided design (CAD) image of a component; producing a physical representation of the component from the nominal CAD image using an additive manufacturing (AM) process; measuring the physical component to obtain measurement data; determining a deviation between geometry associated with the nominal CAD image and the obtained measurement data; determining a compensation field for the deviation, if the deviation is outside of a tolerance threshold; modifying the nominal CAD image by the compensation field; and producing a physical representation of the component from the modified nominal CAD image. Numerous other aspects are provided.

15 Claims, 8 Drawing Sheets

(51) Int. Cl.
  *G01B 21/20* (2006.01)
  *B33Y 50/00* (2015.01)
(52) U.S. Cl.
  CPC .................. *G05B 19/4099* (2013.01); *G05B 2219/35134* (2013.01); *G05B 2219/49023* (2013.01); *Y02P 90/02* (2015.11)

(56) References Cited

U.S. PATENT DOCUMENTS

| | | |
|---|---|---|
| 8,808,800 B2 | 8/2014 | Kumar et al. |
| 8,845,949 B2 | 9/2014 | Coeck |
| 2005/0046873 A1* | 3/2005 | Suzuki ............... G01B 11/2527 356/605 |
| 2013/0166256 A1* | 6/2013 | Wirx-Speetjens ..... B33Y 50/00 703/1 |
| 2015/0004046 A1 | 1/2015 | Graham et al. |
| 2015/0061170 A1* | 3/2015 | Engel .................... B33Y 10/00 264/40.1 |
| 2015/0352794 A1 | 12/2015 | Nguyen et al. |
| 2016/0082666 A1 | 3/2016 | de Pena et al. |

OTHER PUBLICATIONS

Chen, Jack Szu-Shen et al., "Contour generation for layered manufacturing with reduced part distortion", The International Journal of Advanced Manufacturing Technology, vol. 53, Issue 9, Apr. 2011, 11 pp.

Eschey, C. et al., "Rule-Based Free-Form Deformation for Additive Layer Manufacturing", Institute for Machine Tools and Industrial Management, Technische Universitaet Muenchen, Germany, Aug. 11, 2011, 12 pp.

* cited by examiner

SYSTEM AND METHOD FOR DISTORTION MITIGATION AND COMPENSATION IN ADDITIVE MANUFACTURING PROCESSES THROUGH B-SPLINE HYPERPATCH FIELD

BACKGROUND

Additive manufacturing (AM) processes are used to fabricate precision three-dimensional components from a digital model. Such components are fabricated using an additive process, where successive layers of material are solidified one on top of the other. Some AM systems use a laser (or similar energy source) and a series of lenses and mirrors to direct the laser over a powdered material in a pattern provided by a digital model. The laser solidifies the powdered material by sintering or melting the powdered material. Metal powder-bed AM processes have grown more than 50% since 2014.

A challenge in powder-bed AM is distortion mitigation. As a component cools both during and after the additive manufacturing process, the layers of the component shift relative to their as-built position due to the release of thermal and mechanical stresses and strains within the component. As a result, the built component has distortions that make the component unusable without further processing to provide an acceptable level of geometric precision. For example, the impact of distortion, which may be caused by rapid solidification rates, severe temperature gradients, and temperature-dependent phase transformations may be that 10 to 15 iterations of a component may be produced before a Computer-Aided Design (CAD) model may be turned into a geometrically relevant part.

Therefore, it would be desirable to provide a system and method that compensates for the distortions/defects to reduce iterations of non-relevant AM produced components.

BRIEF DESCRIPTION

According to some embodiments, a method includes generating a nominal computer-aided design (CAD) image of a component; producing a physical representation of the component from the nominal CAD image using an additive manufacturing (AM) process; measuring the physical component to obtain measurement data; determining a deviation between geometry associated with the nominal CAD image and the obtained measurement data; determining a compensation field for the deviation, if the deviation is outside of a tolerance threshold; modifying the nominal CAD image by the compensation field; and producing a physical representation of the component from the modified nominal CAD image.

According to some embodiments, a system includes an additive manufacturing device operative to produce a first component; a geometrical compensation module; and a memory in communication with the additive manufacturing device and storing program instructions, the geometrical compensation module operative with the program instructions and additive manufacturing device to perform the functions as follows: generate a nominal computer-aided design (CAD) image of a component; produce a physical representation of the component from the nominal CAD image using an additive manufacturing (AM) process; measure the physical component to obtain measurement data; determine a deviation between geometry associated with the nominal CAD image and the obtained measurement data; determine a compensation field for the deviation, if the deviation is outside of a tolerance threshold; modify the nominal CAD image by the compensation field; and produce a physical representation of the component from the modified nominal CAD image.

A technical effect of some embodiments of the invention is an improved technique and system for reducing the iterations of non-relevant or un-usable components produced by AM processing. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DRAWINGS

DETAILED DESCRIPTION

Figure 1:
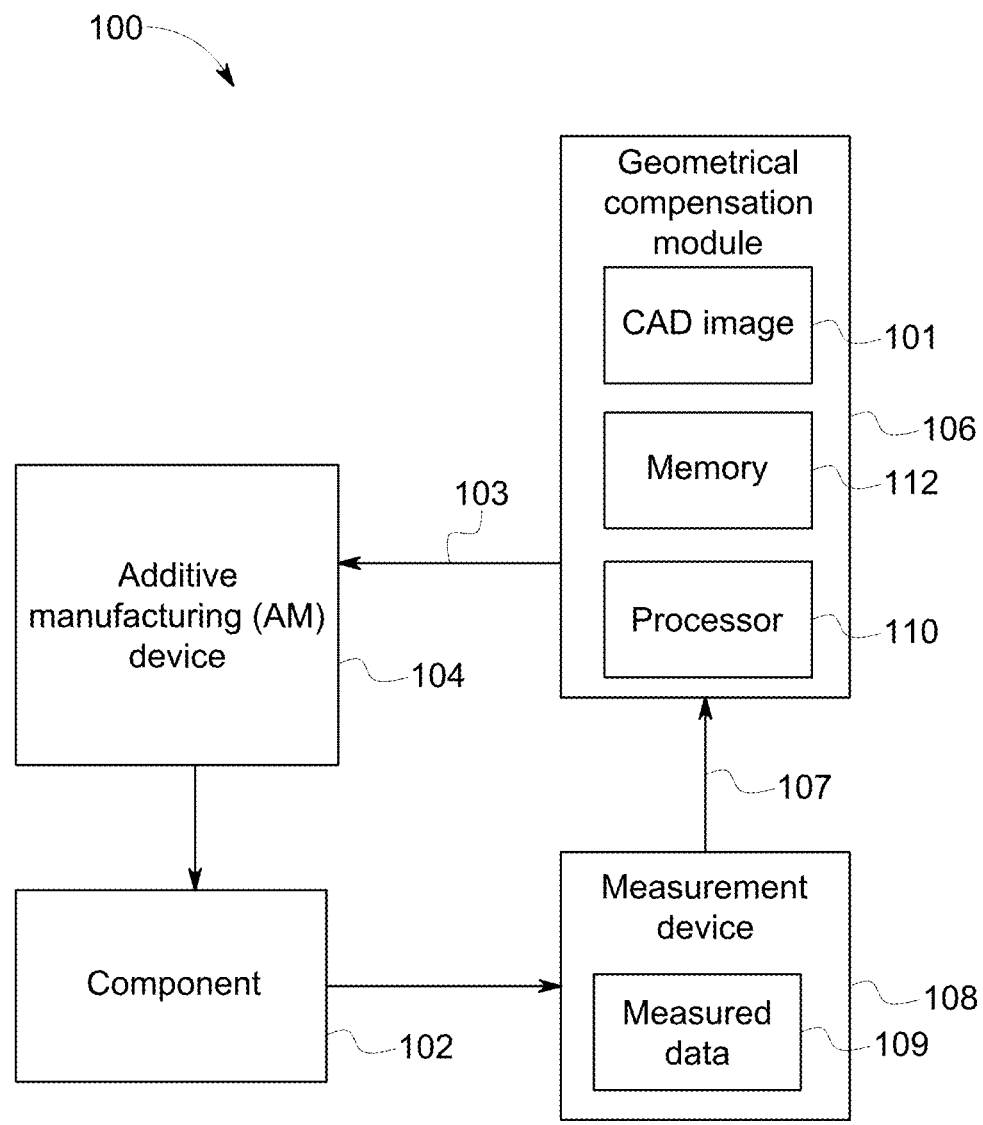
FIG. 1 illustrates a system according to some embodiments.
Figure 2:
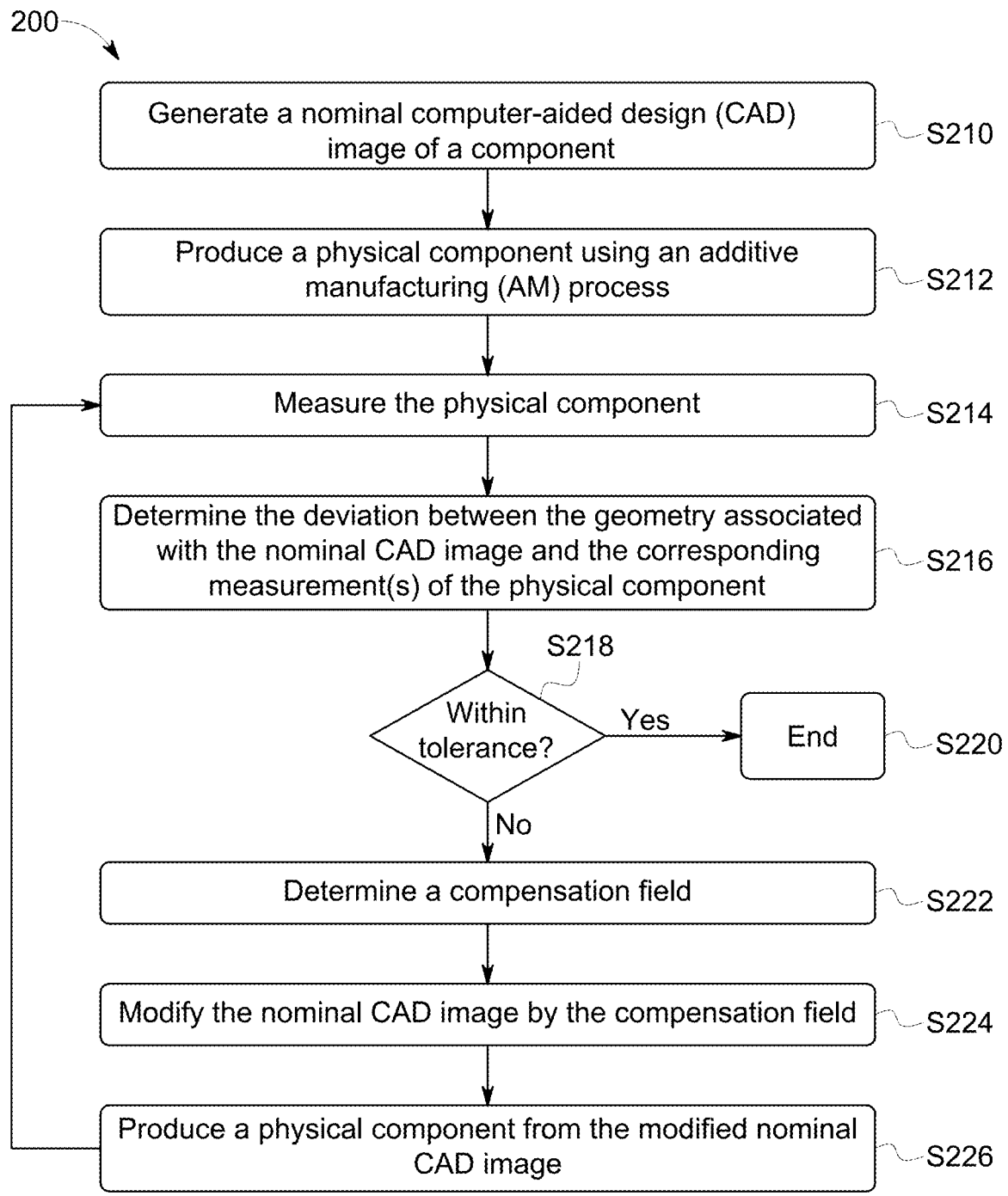
FIG. 2 illustrates a flow diagram according to some embodiments.

Additive manufacturing (AM) processes are used to fabricate precision three-dimensional components from a digital model. Such components are fabricated using an additive process, where successive layers of material are solidified one on top of the other. Some AM systems use a laser (or similar energy source) and a series of lenses and mirrors to direct the laser over a powdered material in a pattern provided by a digital model. The laser solidifies the powdered material by sintering or melting the powdered material. Metal powder-bed AM processes have grown more than 50% since 2014.

A challenge in powder-bed AM is distortion mitigation. As a component cools both during and after the additive manufacturing process, the layers of the component shift relative to their as-built position due to the release of thermal and mechanical stresses and strains within the component. As a result, the built component has distortions that make the component unusable without further processing to provide an acceptable level of geometric precision. For example, the impact of distortion, which may be caused by rapid solidification rates, severe temperature gradients, and temperature-dependent phase transformations may be that 10 to 15 iterations of a component may be produced before a CAD model may be turned into a geometrically-relevant and/or usable part.

Conventionally, some systems compensate for post-build distortion by manipulating/deforming nominal digital two-dimensional cross sections, predicting distortions, compensating for errors in a production machine. In one or more embodiments described herein, for example, the original three-dimensional geometry may be compensated before slicing the image into two-dimensional cross-sections. In one or more embodiments described herein, the geometry compensation is generated based on measurement data of a generated physical component such that the compensation is for differences in the produced physical part. One or more embodiments may provide function based method of compensation where the post-build distortion is compensated by morphing the CAD geometry according to high accuracy, high density measurement data, which is captured by inspection/metrology instruments.

Embodiments provide a method and system for geometrically compensating for the distortions/defects in the AM-produced components to allow the construction of more accurate parts. For example, in some embodiments a computer-aided design (CAD) image of a component may be generated and a real-life physical component may be made from the CAD image using an additive manufacturing (AM) process. The real-life physical component may be measured, and the measurements recorded. The measurements may be made with inspection/meteorology instruments (e.g., CT, laser CMM, blue light, UT, eddy current, etc.) Then the measurements from the real-life physical model may be compared to the measurements from the CAD image to determine one or more geometrical differences between the real-life component and the CAD image. If the difference(s) is within a tolerance threshold, no further compensation is needed. If the difference is outside the tolerance threshold a geometric compensation field for the deviation may be determined based on the high accuracy, high density measurement data. The nominal CAD image may then be modified/morphed/deformed by the compensation field, such that the original three-dimensional geometry may be compensated in a global sense before slicing the image into two-dimensional (2D) cross-sections. The 2D cross-sections may subsequently be used to provide the pattern for the laser during the AM process. A real-life physical component may then be produced from the deformed CAD image. In one or more embodiments, a different geometry compensation may be produced for every geometry/design at any three dimensional position on the component based on measurement data, such that the system compensates for errors in the produced component.

Some benefits of embodiments are the reduction of the number of iterations of expensive reworks before a geometrically relevant component is produced; and the avoidance of tedious, non-reproducible manual corrections. The inventors' note that embodiments may provide for a reduction in cycle time of more than four times and may improve productivity more than four times as compared to conventional correction methods associated with AM processing. This reduction in process iterations may result in a 30 to 40% savings in both energy and raw materials.

Turning to FIGS. 1-5, a system 100 and flow diagrams of examples of operation according to some embodiments are provided. In particular, FIGS. 2 and 3 each provide a flow diagram of a process 200 and 300 respectively, according to some embodiments. Processes 200/300 and other processes described herein may be performed using any suitable combination of hardware (e.g., circuit(s)), software or manual means. In one or more embodiments, the system 100 is conditioned to perform the processes 200/300 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto.

Initially, at S210, a nominal computer-aided design (CAD) image 101 of a component 102 to manufacture via an additive manufacturing (AM) device 104 is generated by a geometrical compensation module 106. The geometrical compensation module 106 may include one or more processing elements 110 and a memory 112. The processor 110 may, for example, be a conventional microprocessor, and may operate to control the overall functioning of the geometrical compensation module 106. In one or more embodiments, the geometrical compensation module 106 may include a communication controller for allowing the processor 110, and hence the geometrical compensation module 106, to engage in communication over data networks with other devices (e.g., the measurement device 108.) In one or more embodiments, the geometrical compensation module 106 may include one or more memory and/or data storage devices 112, which may comprise any combination of one or more of a hard disk drive, RAM (random access memory), ROM (read only memory), flash memory, etc. The memory/data storage devices 112 may store software that programs the processor 110 and the geometrical compensation module 106 to perform functionality as described herein In one or more embodiments, the nominal CAD geometry (Boundary Representation (B-rep) or Constructive Solid Geometry (CSG) in the image may be converted to a .stl format (stereolithography file format), or any other suitable secondary format, where the secondary format is different from the original file format. Conventionally, B-rep and CSG may be methods for representing shapes in solid modeling. Stereolithography format files may describe only the surface geometry of a three-dimensional object using triangular mesh without any representation of color, texture or other common CAD model attributes, which may make it a more desirable file format for rapid prototyping. In some embodiments, the nominal CAD image 101 in the .stl format may be transmitted 103 to the AM device 104 to build a physical component 102. In some embodiments, the nominal CAD image 101 may not be converted to another format prior to transmission to the AM device 104.

Figure 4A:
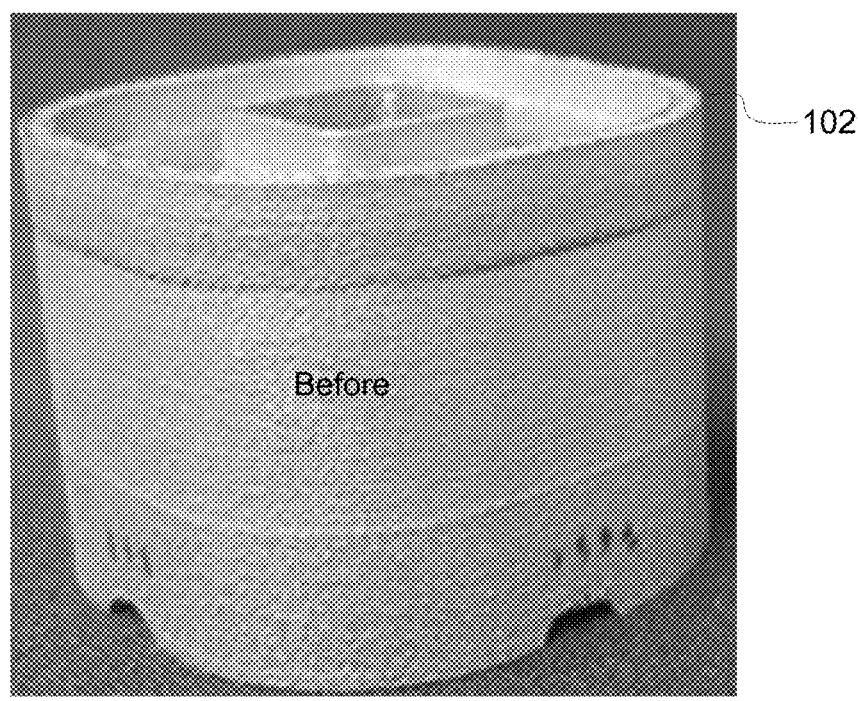
FIGS. 4A-4E illustrate images according to some embodiments.

Turning back to the process 200, at S212, a physical component 102 is produced using an AM process at the AM device 104. For example, as shown in FIG. 4A, the physical component 102 may be a micro-mixer. Any other suitable component producible by an AM process may be used. In some embodiments, prior to producing the physical component 102, the nominal CAD image 101 may be sliced with a set of planes resulting in a set of one or more 2D layers to obtain the path of the laser for each layer during the additive manufacturing process.

Figure 4B:
Figure 4C:
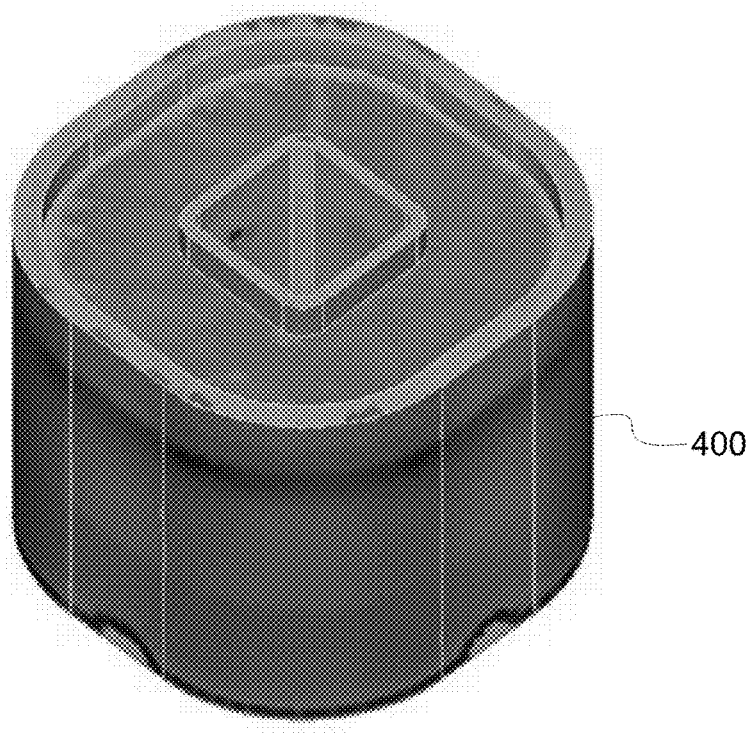

Then in S214, the physical component 102 is measured via a measurement device 108 to capture the geometry of at least one of the external and internal surface of the physical component 102 (FIG. 4B). The measurement device 108 may be a coordinate measuring machine (CMM), an X-ray Computed Tomography (CT) system, CT, blue light, Ultrasonic Testing, eddy current, or any other suitable inspection/meteorology device. In one or more embodiments, the measurement data may be point-cloud coordinate data. In one or more embodiments, the point-cloud coordinate measurements may be transformed (e.g., via post-processing at the AM device) into triangular-mesh data. The measured data 109 may be transmitted to the geometrical compensation module 106.

A deviation 400 (FIG. 4C) between at least one measurement or geometry associated with the nominal CAD image 101 and the corresponding measurement 109 of the physical component 102 is determined in S216 by the geometrical compensation module 106. In one or more embodiments, the deviation 400 may be determined between each geometry in the nominal CAD image 101 and each corresponding measurement 109 of the physical component 102. In one or more embodiments, the deviation 400 may be directly output from the measurement device 108. While the type of measurement data described above was point-cloud coordinate data, other suitable types of data may be used. For example, the measurement data may be a vector field derived from measured errors across a surface of the component. In one or more embodiments, the deviation may be represented as a set of column vectors. As used herein, the "deviation" may also be referred to as the "displacement field." In some embodiments, the set of column vectors may include six column vectors $\vec{q}_i(x_i, y_i, z_i, \delta x_i, \delta y_i, \delta z_i)$. The set of column vectors may be divided into two halves: the nominal or desired geometry $\vec{N}$ (x, y, z) and the displacement vectors $\vec{D}$ for the difference between the nominal CAD image 101 and the physical component 102.

$$\vec{N} = \{\vec{n}_i | \vec{n}_i = (x_i, y_i, z_i) \in \Re^3\}, 0 < i < n$$

$$\vec{D} = \{\vec{d}_i | \vec{d}_i = (\delta x_i, \delta y_i, \delta z_i) \in \Re^3\}, 0 < i < n$$

Figure 5:
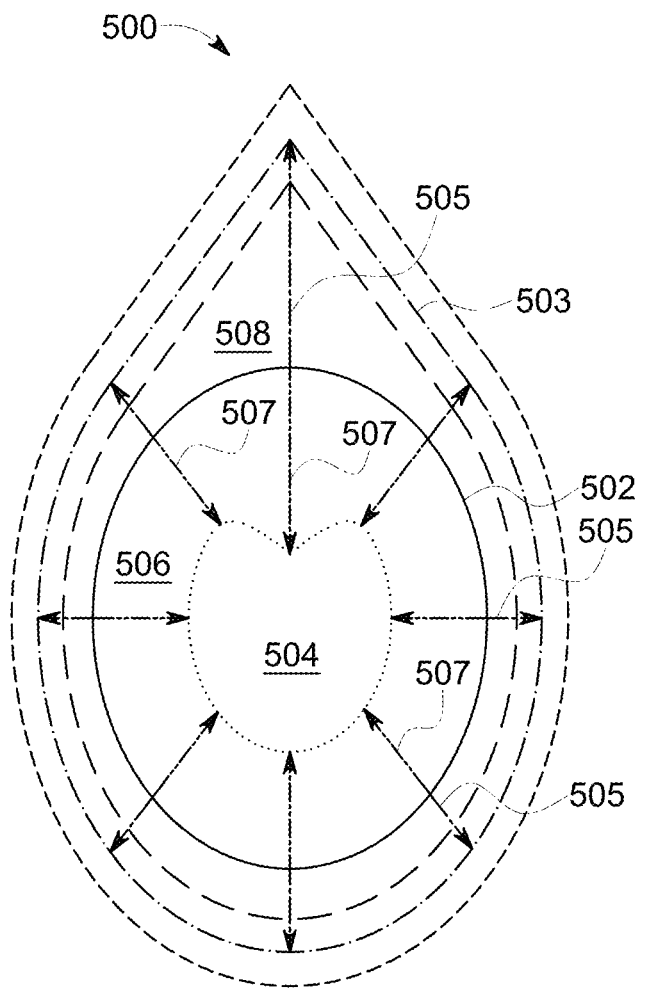
FIG. 5 illustrates a deviation map according to some embodiments.

In some embodiments, the measured data 109 in S214 and the nominal CAD image 101 geometry may be superimposed within a point data pre-processing software (e.g., Imageware®, Polyworks® and Geomagic®) to achieve a best fit/feature based alignment of the measured data 109 and the nominal CAD image 101 at the geometrical compensation module 106 prior to calculating the deviation in S216. In one or more embodiments, the deviation may be plotted on a deviation map 500 (FIG. 5). For example, in FIG. 5 the deviation map 500 includes a model 502 of the nominal CAD image 101, a model 504 of the physical component 102, and a deviation or displacement field 506 (shown as the area between the physical component model 504 and a perimeter of the nominal CAD model 502, represented by the arrows 507).

Turning back to the process 200, in S218 it is determined if the deviation 400 is within a pre-defined tolerance threshold. If the deviation is within the pre-defined tolerance threshold, the process 200 ends at S220. If the deviation 400 is not within the pre-defined tolerance threshold, the process 200 continues to S222, and a compensation field 508 (FIG. 5) is determined, as described in more detail with respect to FIG. 3. As shown in FIG. 5, for example, the compensation field 508 may be the area between the nominal CAD model 502 and a perimeter 503 of the compensated geometry, represented by the arrows 505.

The compensated geometry $\vec{C}$ may be calculated as follows:

$$\vec{C} = \vec{N} - k\vec{D}$$

where $\vec{N}$ represents an identify function (or nominal field), $\vec{D}$ is the displacement field and factor k is the scaling factor or overcompensation factor. In one or more embodiments, k may be a positive value around 1.

In one or more embodiments, discrete vectors (e.g., compensated geometry) may be approximated and extrapolated by a continuous analytical function, such as a Basis (B)-spline hyper-patch to calculate the compensation field. Other suitable analytical functions may be used (e.g., discontinuous, polynomial, distance-based function, inverse function) to calculate the compensation field at any point in the space. In one or more embodiments, a discontinuous analytical function may be used, for example, in an instance where the component has multiple hyper-patch surface to abruptly transition from one surface to another. In one or more embodiments, the approximation and extrapolation may be performed by a multi-level B-spline morphing process.

Figure 4D:
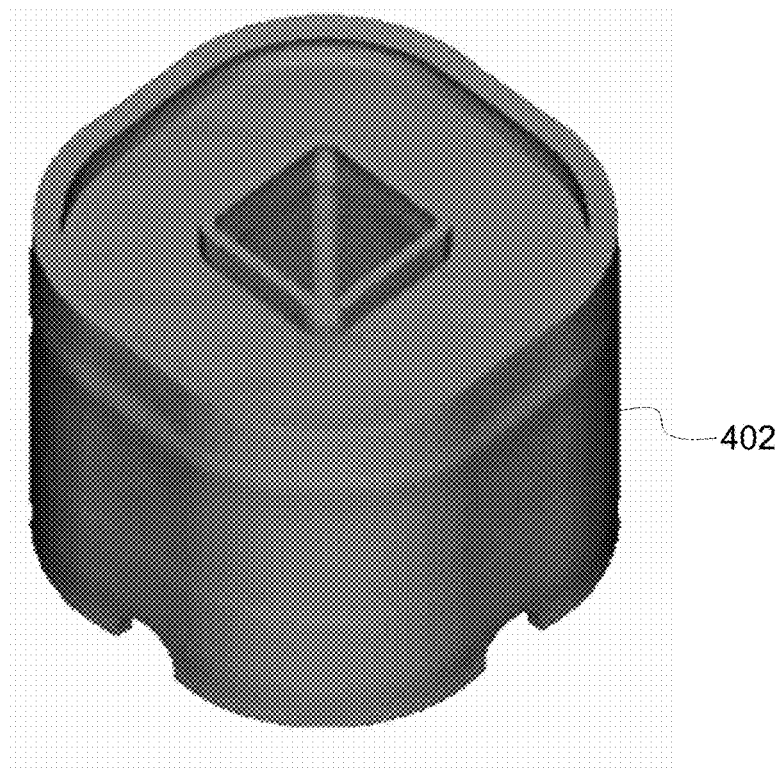
Figure 4E:
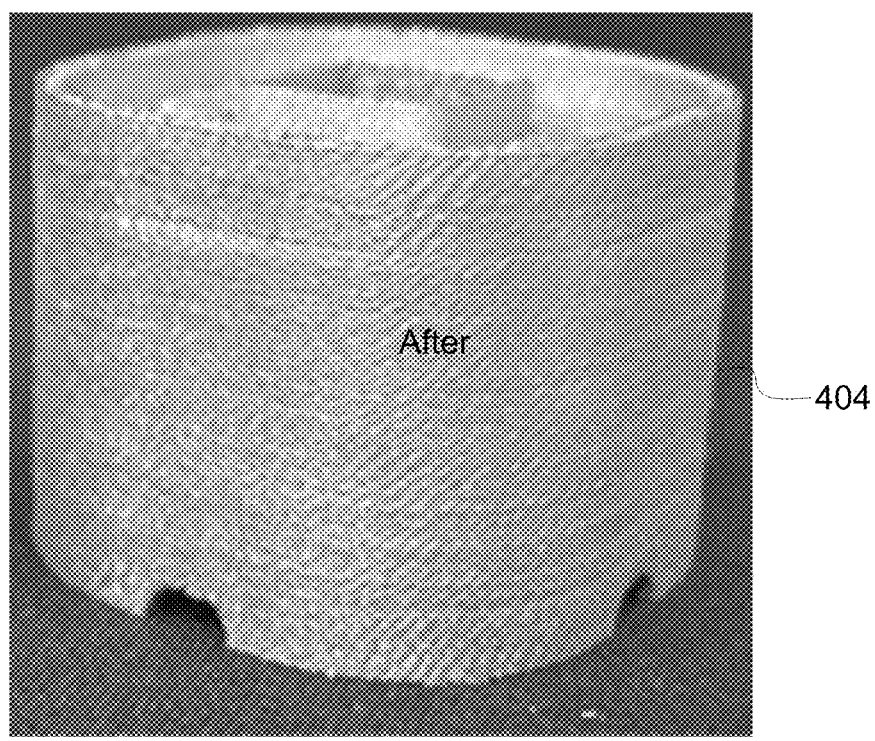

At S224, the nominal CAD image 101 is modified by the compensation field 508, resulting in a modified nominal CAD image 402 (FIG. 4D). In one or more embodiments, the overall modified shape may be larger than the nominal shape to account for the expected shrinkage. In some embodiments, the modified shape may include one or more regions that are larger than the nominal shape and one or more regions that are smaller than the nominal shape. The regions that are larger than the nominal shape may account for expected shrinkage, while regions that are smaller than the nominal shape may account for regions that expand due to the stress of the process. For example, in FIG. 4C, the lighter regions on a top surface of the component may measure larger than the nominal CAD image, while the darker sides of the component ma measure smaller than the nominal CAD image. In one or more embodiments, the nominal CAD image 101 (e.g., nominal triangular mesh) may be modified by the compensation field 508 (e.g., represented by tri-variate B-spline hyper-patch) to have a modified shape. In one or more embodiments, the nodes or points may be moved from a first position in the nominal CAD image 101 to the modified position (e.g., second position) per the compensation field 508 to achieve the modified shape (e.g., modified nominal CAD image 402).

In one or more embodiments, one or more layers are then extracted from the modified nominal CAD image 402 prior to producing a physical representation of the component from the modified nominal CAD image to provide a path for the laser for each layer in the AM process. Then at S226, a modified physical component 404 (FIG. 4E) is produced from the modified nominal CAD image 402. In other words, the modified shape (e.g., modified triangular mesh) may replace the nominal triangular mesh as the start point of the next production cycle of the physical component, in one or more embodiments.

The process 200 may proceed back to S214 and continue until the overall geometrical deviation of the component is determined to be within a given tolerance threshold at S218.

Figure 3:
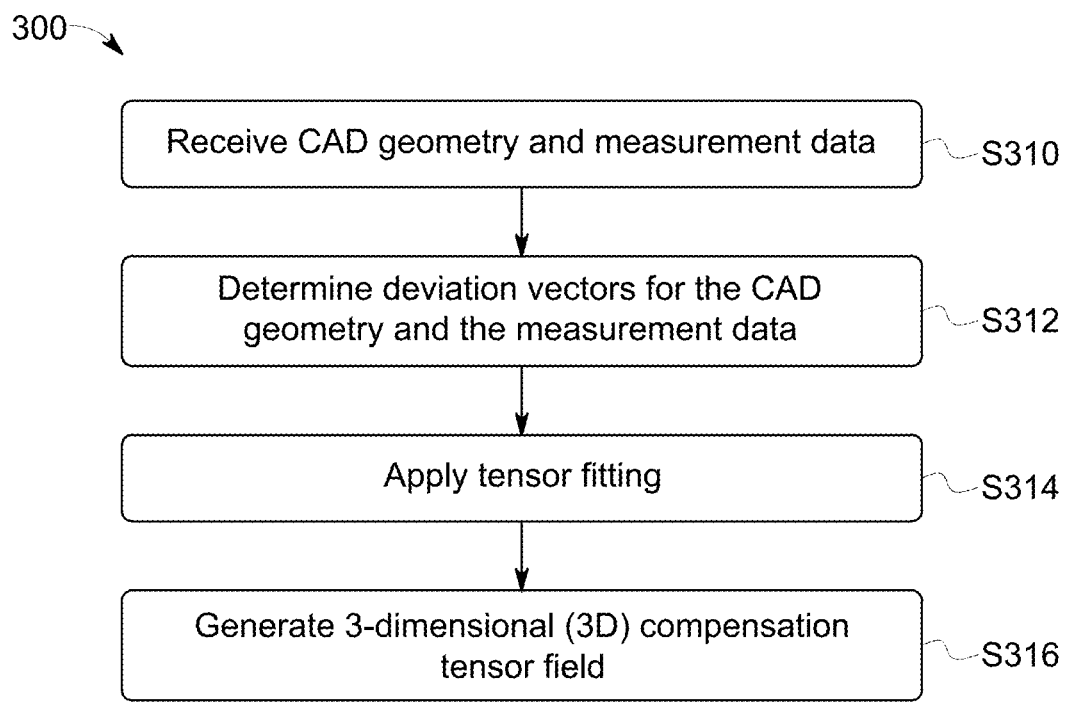
FIG. 3 illustrates a flow diagram according to some embodiments.

Turning to FIG. 3, a process 300 for building the compensation field 508 is provided, according to some embodiments. Initially, at S310, the geometrical compensation module 106 may receive the geometry associated with the nominal CAD model 502 and the measurements 109 associated with the physical component 102. In one or more embodiments, the geometry associated with the nominal CAD model 502 may be a B-spline surface geometry. Other suitable geometry may be used.

Then in S312, one or more deviation vectors (e.g., $\vec{q}_i(x_i, y_i, z_i, \delta x_i, \delta y_i, \delta z_i)$) is determined for geometry associated with the nominal CAD model 502 and the physical component 102. A multi-level B-spline tensor fitting (e.g., multi-level B-spline interpolation and approximation (MBIA)) is applied in S314. Other suitable tensor fitting processes may be used. Then the tensor fitting is used to generate a three dimensional (3D) compensation tensor field (e.g., compensation field 508) in S316. The compensation field 508 may then be applied to the nominal CAD image 101 to modify the nominal CAD image as described above with respect to S224 in FIG. 2. In one or more embodiments, the compensation field may enable a smooth shape modification to any triangular mesh within it. The inventors note that MBIA may circumvent the tradeoff between smoothness and accuracy requirements in object modeling, MBIA may be fast, and MBIA may have linear time complexity with respect to the number of data points used. In one or more embodiments, the MBIA may be extended to tri-variate, to account for three independent variables: x, y, and z; and three dependent variables: δx, δy, δz. In one or more embodiments, the tri-variate MBIA may be stated as follows: given a set of data points $Q=\{(x_i, y_i, z_i, \delta x_i, \delta y_i, \delta z_i) \in \mathbb{R}^6\}$, find a vector function $F:\mathbb{R}^3 \rightarrow \mathbb{R}^2$ that interpolates or approximates the value of $(\delta x_i, \delta y_i, \delta z_i)$ at $(x_i, y_i, z_i)$, i.e. $\vec{F}(x_i, y_i, z_i) \approx (\delta x_i, \delta y_i, \delta z_i)$. Then a uniform tri-cubic B-spline may be adopted to represent each component (δx, δy or δz) of such a function:

$$\begin{cases} F^{\delta x}(x, y, z) = \sum_{\alpha=0}^{3}\sum_{\beta=0}^{3}\sum_{\gamma=0}^{3} N_\alpha(u)N_\beta(v)N_\gamma(w)p_{i_0+\alpha, j_0+\beta, k_0+\gamma}^{\delta x} \\ F^{\delta y}(x, y, z) = \sum_{\alpha=0}^{3}\sum_{\beta=0}^{3}\sum_{\gamma=0}^{3} N_\alpha(u)N_\beta(v)N_\gamma(w)p_{i_0+\alpha, j_0+\beta, k_0+\gamma}^{\delta y} \\ F^{\delta z}(x, y, z) = \sum_{\alpha=0}^{3}\sum_{\beta=0}^{3}\sum_{\gamma=0}^{3} N_\alpha(u)N_\beta(v)N_\gamma(w)p_{i_0+\alpha, j_0+\beta, k_0+\gamma}^{\delta z} \end{cases}$$

where $N_\alpha$, $N_\beta$ and $N_\gamma$ denote the uniform cubic B-spline basis functions:

$$\begin{cases} N_0(t) = (1-t)^3/6, \\ N_1(t) = (3t^3 - 6t^2 + 4)/6, \\ N_2(t) = (-3t^3 + 3t^2 + 3t + 1)/6, \\ N_3(t) = t^3/6, \end{cases} \text{where } 0 \le t < 1$$

and $$\begin{cases} u = \dfrac{x - p_{i_0+1, j_0+1, k_0+1}^{x}}{p_{i_0+2, j_0+2, k_0+2}^{x} - p_{i_0+1, j_0+1, k_0+1}^{x}} \\ v = \dfrac{y - p_{i_0+1, j_0+1, k_0+1}^{y}}{p_{i_0+2, j_0+2, k_0+2}^{y} - p_{i_0+1, j_0+1, k_0+1}^{y}} \\ w = \dfrac{z - p_{i_0+1, j_0+1, k_0+1}^{z}}{p_{i_0+2, j_0+2, k_0+2}^{z} - p_{i_0+1, j_0+1, k_0+1}^{z}} \end{cases}$$

where $i_0 = \lfloor x \rfloor - 1$, $j_0 = \lfloor y \rfloor - 1$ and $k_0 = \lfloor z \rfloor - 1$.

Other suitable B-splines, including, but not limited to, linear, quadratic, and quartic B-splines, may also be adopted to represent the above components of δx, δy and δz.

In one or more embodiments, the use of the MBIA may be to fit the input data with a coarse to fine hierarchy to generate a sequence of B-spline functions, and then to get the final approximated function by combining this sequence of B-spline functions using a B-spline refinement or subdivision rule, as described further below. While MBIA extended to tri-variate, which is a variant of conventional bivariate MBIA, is an example used herein, other ways of determining a compensation field may also be used. In some embodiments, with respect to tri-variate MBIA, the compensation tensor field may be determined by first receiving input data set Q and setting up the B-spline domain, where k=1. Then, for each point $q_d$ in the data set Q, the contribution from $q_d$ to the 4×4×4 neighbor coefficients may be calculated. For each point in a control net $\Phi_k$ at the k-th level, the contributions from different points may be averaged. Then the residual $Q_k = \{(x_i, y_i, z_i, \delta x_i - F^{\delta x}(x_i, y_i, z_i), \delta y_i - F^{\delta y}(x_i, y_i, z_i), \delta z_i - F^{\delta z}(x_i, y_i, z_i))\}$ may be calculated and $Q = Q_k$. If k<h, a new finer control net of $\Phi_k$ may be set up, where k=k+1, and then the contribution is again calculated as described above. In one or more embodiments, this loop may continue until k=h, where h is the total levels. Then each control net of $\Phi_k$ may be added to get the final control net at the finest level of refinement, representing the final approximated function.

Figure 6:
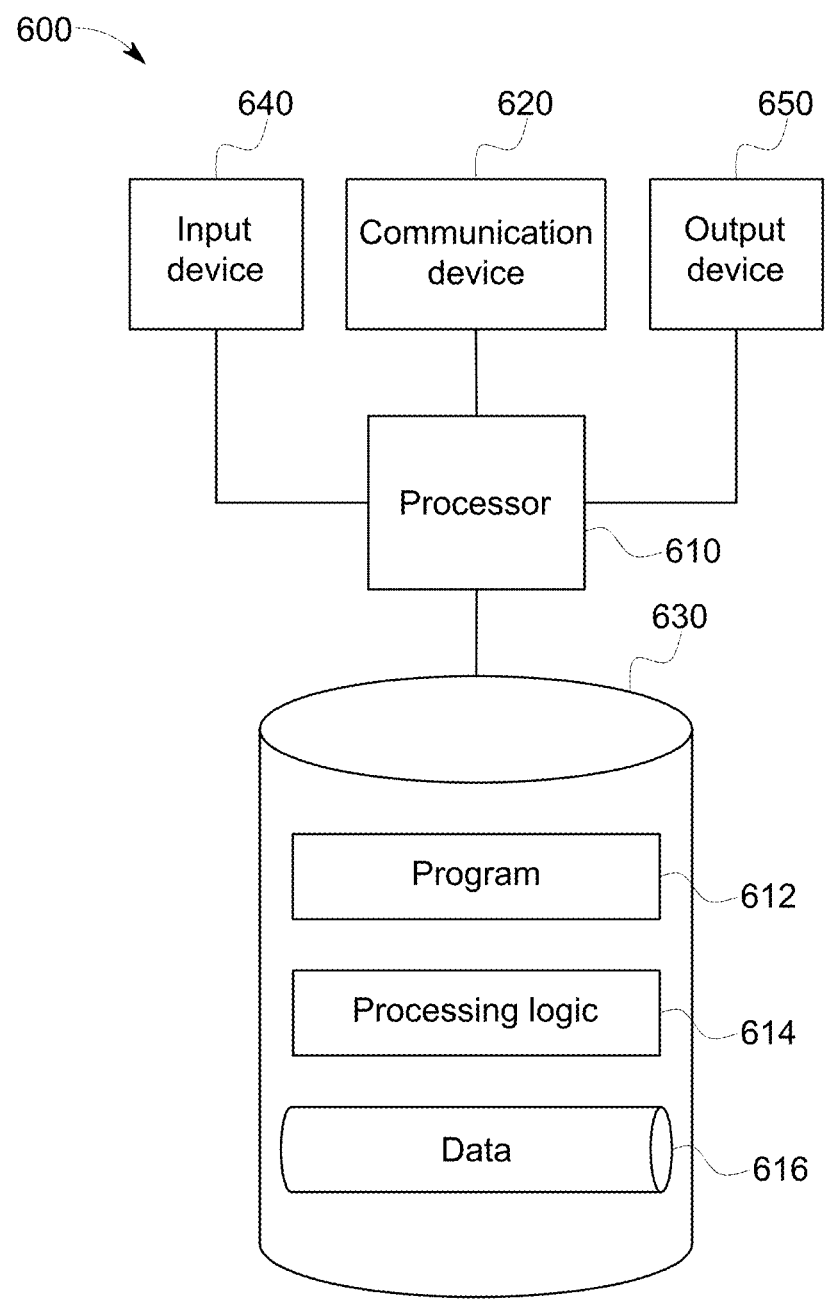
FIG. 6 illustrates s a block diagram of a system according to some embodiments.

Note the embodiments described herein may be implemented using any number of different hardware configurations. For example, FIG. 6 illustrates a geometrical compensation processing platform 600 that may be, for example, associated with the system 100 of FIG. 1. The geometrical compensation processing platform 600 comprises a geometrical compensation processor 610 ("processor"), such as one or more commercially available Central Processing Units (CPUs) in the form of one-chip microprocessors, coupled to a communication device 620 configured to communicate via a communication network (not shown in FIG. 6). The communication device 620 may be used to communicate, for example, with one or more users. The geometrical compensation processing platform 600 further includes an input device 640 (e.g., a mouse and/or keyboard to enter information about the measurements and/or assets) and an output device 650 (e.g., to output and display the data and/or recommendations).

The processor 610 also communicates with a memory/storage device 630. The storage device 630 may comprise any appropriate information storage device, including combinations of magnetic storage devices (e.g., a hard disk drive), optical storage devices, mobile telephones, and/or semiconductor memory devices. The storage device 630 may store a program 612 and/or geometrical compensation processing logic 614 for controlling the processor 610. The processor 610 performs instructions of the programs 612, 614, and thereby operates in accordance with any of the embodiments described herein. For example, the processor 610 may receive nominal CAD image data and then may apply the geometrical compensation module 106 via the instructions of the programs 612, 614 to generate a modified CAD image to generate a component 102.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

As used herein, information may be "received" by or "transmitted" to, for example: (i) the platform 600 from another device; or (ii) a software application or module within the platform 600 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a geometrical compensation module. The method steps can then be carried out using the distinct software modules and/or sub-modules of the system, as described above, executing on one or more hardware processors 610 (FIG. 6). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method comprising:
generating a nominal computer-aided design (CAD) image of a component;
producing a first physical representation of the component from the nominal CAD image using an additive manufacturing (AM) process;
measuring the first physical representation of the physical component to obtain measurement data, wherein the measurement data is point-cloud coordinate data taken from internal and external surfaces of the first physical representation of the component;
determining a deviation between an original three-dimensional geometry associated with the nominal CAD image and the obtained measurement data, wherein the deviation is represented as a set of column vectors;
applying one of a continuous function and a discontinuous function to the set of column vectors to determine a compensation field for the deviation;
modifying the nominal CAD image by the compensation field such that the original three-dimensional geometry associated with the nominal CAD image is modified;
extracting one or more layers from the modified nominal CAD image prior to producing a second physical representation of the component from the modified nominal CAD image; and
producing the second physical representation of the component from the modified nominal CAD image.

2. The method of claim 1, further comprising:
converting the nominal CAD image to a secondary file format prior to producing the physical representation of the component; and
producing the physical representation of the component from the secondary format.

3. The method of claim 1, wherein the first physical representation of the component is measured by one of a coordinate measuring machine (CMM), an X-ray Computed Tomography system, blue light, ultrasonic testing (UT), and eddy current.

4. The method of claim 1, further comprising:
generating triangular mesh data from the point-cloud coordinate data.

5. The method of claim 1, wherein prior to determining the deviation, the method further comprises:
aligning the obtained measurement data and the geometry associated with the nominal CAD image in a superimposed manner within a point data application.

6. The method of claim 1, wherein the compensation field is a three dimensional compensation tensor field.

7. The method of claim 1, wherein the continuous function is a B-spline hyperpatch.

8. The method of claim 7, wherein the B-spline hyperpatch is a trivariate B-spline hyperpatch having three associated independent variables.

9. The method of claim 1, wherein modifying the nominal CAD image by the compensation field further comprises:
moving a point from a first position associated with the nominal CAD image to a second position associated with the compensation field.

10. The method of claim 9, wherein at least one region of the modified nominal CAD image is one of larger than and smaller than the nominal CAD image.

11. A system comprising:
an additive manufacturing device operative to fabricate a first component;
a geometrical compensation module; and
a memory in communication with the additive manufacturing device and storing program instructions, the geometrical compensation module operative with the program instructions and additive manufacturing device to perform functions as follows:
generate a nominal computer-aided design (CAD) image of a component;
produce a first physical representation of the component from the nominal CAD image using an additive manufacturing (AM) process;

measure the first physical representation of the component to obtain measurement data, wherein the measurement data is point-cloud coordinate data taken from internal and external surfaces of the first physical representation of the component;

determine a deviation between an original three-dimensional geometry associated with the nominal CAD image and the obtained measurement data, wherein the deviation is represented as a set of column vectors;

apply one of a continuous function and a discontinuous function to the set of column vectors to determine a compensation field for the deviation;

modify the nominal CAD image by the compensation field such that the original three-dimensional geometry associated with the nominal CAD image is modified;

extract one or more layers from the modified nominal CAD image prior to producing a second physical representation of the component from the modified nominal CAD image; and produce the second physical representation of the component from the modified nominal CAD image.

12. The system of claim 11, wherein the nominal CAD image is converted to a secondary file format prior to producing the physical representation of the component.

13. The system of claim 11, wherein the first physical representation of the component is measured by one of a coordinate measuring machine (CMM), an X-ray Computed Tomography system, blue light, ultrasonic testing (UT), and eddy current.

14. The system of claim 11, wherein the continuous function is a B-spline hyperpatch.

15. The system of claim 11, wherein the geometrical compensation module is further operative to:
    determine whether the deviation is outside of a tolerance threshold, and
    wherein when the deviation is outside of the tolerance threshold, the geometrical compensation module is operative to modify the nominal CAD image by the compensation field such that the geometry associated with the nominal CAD image is modified globally and produce the physical representation of the component from the modified nominal CAD image.

* * * * *